US009689318B1

(12) United States Patent
Powell et al.

(10) Patent No.: US 9,689,318 B1
(45) Date of Patent: Jun. 27, 2017

(54) EQUILIBRATING FLOW DISTRIBUTOR

(71) Applicant: JANSEN'S AIRCRAFT SYSTEMS CONTROLS, INC., Tempe, AZ (US)

(72) Inventors: Jerame James Powell, Laveen, AZ (US); Harvey B. Jansen, Mesa, AZ (US)

(73) Assignee: JANSEN'S AIRCRAFT SYSTEMS CONTROLS, INC., Tempe, AZ (US)

( * ) Notice: Subject to any disclaimer, the term of this patent is extended or adjusted under 35 U.S.C. 154(b) by 36 days.

(21) Appl. No.: 14/956,649

(22) Filed: Dec. 2, 2015

Related U.S. Application Data

(60) Provisional application No. 62/086,614, filed on Dec. 2, 2014.

(51) Int. Cl.
| F02C 7/228 | (2006.01) |
| F02C 9/32 | (2006.01) |
| F23R 3/34 | (2006.01) |
| F16K 11/07 | (2006.01) |
| G05D 7/06 | (2006.01) |

(52) U.S. Cl.
CPC ............... *F02C 9/32* (2013.01); *F02C 7/228* (2013.01); *F16K 11/0716* (2013.01); *F23R 3/34* (2013.01); *G05D 7/0664* (2013.01); *Y10T 137/2524* (2015.04)

(58) Field of Classification Search
CPC ......... Y10T 137/2516; Y10T 137/2524; F02C 7/228; F02C 9/32
USPC .................................................... 60/734, 739
See application file for complete search history.

(56) References Cited

U.S. PATENT DOCUMENTS

| 3,033,277 | A | * | 5/1962 | Cowles | ............... | F02C 9/16 |
| | | | | | | 137/100 |
| 4,531,535 | A | * | 7/1985 | Kiernan | ............ | F02C 7/228 |
| | | | | | | 137/99 |
| 4,564,038 | A | * | 1/1986 | Kalmanczhelyi | ...... | B60K 17/10 |
| | | | | | | 137/101 |
| 5,412,949 | A | * | 5/1995 | Joland | ............... | F02C 7/228 |
| | | | | | | 137/38 |
| 5,845,484 | A | * | 12/1998 | Maker | ............... | F02C 9/263 |
| | | | | | | 60/39.281 |
| 6,854,257 | B2 | * | 2/2005 | Leblanc | ............ | F02C 7/228 |
| | | | | | | 60/39.281 |
| 6,931,831 | B2 | | 8/2005 | Jansen | | |
| 7,137,613 | B2 | | 11/2006 | Jansen | | |
| 8,316,630 | B2 | * | 11/2012 | Futa | .............. | F02C 7/228 |
| | | | | | | 60/39.281 |

(Continued)

*Primary Examiner* — Kevin Murphy
(74) *Attorney, Agent, or Firm* — Lorenz & Kopf, LLP.

(57) ABSTRACT

An equilibrating flow distributor for a gas turbine engine includes a balancing valve and multiple flow dividers, each with a movable valve or divider member. The balancing valve has an inlet receiving media at a first pressure area and an outlet defining a plurality of first metering orifices. The valve member defines at least one second metering orifice receiving the media at a second pressure area. Each flow divider has an inlet receiving the media through an associated one of the first metering orifices at a third pressure area and an outlet defining one of a plurality of third metering orifices receiving the media at a fourth pressure area. Each flow divider has a second pressure area in communication with second pressure area of the balancing valve. Flow through the fourth pressure area of each flow divider is substantially the same.

20 Claims, 5 Drawing Sheets

(56) References Cited

U.S. PATENT DOCUMENTS

| | | | |
|---|---|---|---|
| 8,464,740 B2* | 6/2013 | Zielinski | F23K 5/06 137/100 |
| 2010/0162708 A1* | 7/2010 | Erickson | F02C 7/232 60/734 |
| 2013/0042622 A1* | 2/2013 | Zebrowski | F23K 5/06 60/746 |

* cited by examiner

EQUILIBRATING FLOW DISTRIBUTOR

CROSS-REFERENCE TO RELATED APPLICATION(S)

This application claims priority to U.S. provisional application Ser. No. 62/086,614, filed Dec. 2, 2014.

STATEMENT OF FEDERALLY SPONSORED RESEARCH OR DEVELOPMENT

Not applicable.

FIELD OF THE DISCLOSURE

The present invention relates to flow control devices, and in particular, to a flow distribution arrangement for regulating fuel flow to the burners of turbine engine systems.

BACKGROUND OF THE DISCLOSURE

Turbine engines may be used to power various types of flight vehicles, including supersonic and hypersonic air and space vehicles and weaponry. Generally, gas turbine engines generate compressed air from a compressor section that enters a combustor section where an array of fuel nozzles injects a steady stream of fuel into the compressed air stream. The compressed air and fuel mixture is then ignited by one or more burners causing rapidly expanding air to flow through a turbine section, which in turn causes rotationally mounted turbine blades to rotate and generate energy to drive the compressor section, among others. The turbine section may have multiple stages to more efficiently extract energy from the airflow. The air exiting the turbine section is exhausted from the engine via an exhaust section, which may include an afterburner, thereby creating thrust. Supersonic and hypersonic flight requires that the turbine engine rapidly burn a considerable amount of fuel and rapidly displace a considerable amount of air, which in turn, leads to a significant amount of friction, and thus, heat generated by the turbine engine.

The output power of a turbine engine may be controlled by metering the fuel and air flows into the engine. To burn high flow volumes, modern gas turbine engines divide the fuel flow and burning into several (e.g., 6, 8 or 10) injection sites or combustion zones. The combustion zones are typically arranged in an array (e.g., a ring pattern), such that burned fuel in each combustion zone provides a flame front that effects a pressure change that drives the turbine blades. The pressure differential is dependent upon the temperature of the flame front. The higher the flame temperature, the greater the change in pressure, and thus the more power output from the turbine engine. The overall flame temperature is actually an average of the flame temperature at each burner or combustion zone. The temperature gradient profile of the several burners is defined by its "pattern factor," which is typically defined as the difference between the peak and average combustor exit temperatures divided by the average exit temperature.

Ideally, the average flame temperature of all combustion zones should equal the flame temperature at the flame front so that the pattern factor is zero. However, practically, the average temperature is some valve less than the peak temperature, resulting in a positive pattern factor value. Should one or more combustion zones have a significantly relatively lower temperature than the others, the average flame front temperature can vary significantly from the peak temperature, thereby resulting in a high pattern factor, and inefficient operation of the turbine as well as the possible generation of pressure oscillations that may impart vibrations or other mechanical anomalies to the moving components (e.g., various vanes and blades) of the turbine engine.

High pattern factors, or temperature profile variations, may result from inconsistent fuel flow to the various injector nozzles of the combustion zones. Inconsistent fuel flow may result from even slight differences in the dimensioning or tolerances of the flow valves as well as from deterioration (e.g., coking) due to the contaminated and aggravated temperature environments in which the valves and nozzles are operated. Systems for actively controlling the turbine pattern factor may include electronic controls that use temperature feedback signals at the injector nozzles. Yet, such systems, for example those in large-scale power generating gas turbines, may introduce cost, weight, and failure points to the system, and may be insufficiently responsive or accurate to perform adequately at the high flow rates and pressures experienced in hypersonic flight applications to achieve the desired pattern factor control of the burner temperature profile.

SUMMARY OF THE DISCLOSURE

The disclosure provides a flow distributor for a gas turbine engine, for example, to equally distribute fuel flow to the various burners of a turbine engine.

In one aspect the disclosure provides an equilibrating flow distributor for a gas turbine engine, including a balancing valve and a plurality of flow dividers. The balancing valve includes a valve member movable along a stroke axis. The balancing valve has an inlet receiving media at a first pressure area and an outlet defining a plurality of first metering orifices. The valve member defines at least one second metering orifice receiving the media at a second pressure area. Each flow divider includes a divider member movable along a stroke axis. Each flow divider has an inlet receiving the media through an associated one of the first metering orifices at a third pressure area and an outlet defining one of a plurality of third metering orifices receiving the media at a fourth pressure area. Each of the flow dividers has a second pressure area in communication with the second pressure area of the balancing valve. Flow through the fourth pressure area of each flow divider is substantially the same.

In another aspect the disclosure provides an equilibrating flow distributor for a gas turbine engine, including a balancing valve and a plurality of flow dividers. The balancing valve includes a valve body and a valve member movable within the valve body along a stroke axis. The valve body has an inlet receiving media at a first pressure area and an outlet defining a plurality of first metering orifices. The valve member defines at least one second metering orifice receiving the media at a second pressure area. Each flow divider includes a divider body and a divider member movable along a stroke axis within the divider body. Each divider body has an inlet receiving the media through an associated one of the first metering orifices at a third pressure area and an outlet defining one of a plurality of third metering orifices receiving the media at a fourth pressure area. The balancing valve and each of the flow dividers has a second pressure area. The second pressure area of the balancing valve is at a side of the valve member opposite the first pressure area, and the second pressure area of each flow divider is at a side of the divider member opposite the third pressure area. Flow through the fourth pressure area of each flow divider is substantially the same. A flow area of the third metering orifice of at least one of the flow dividers is different than the others.

In yet another aspect the disclosure provides an equilibrating flow distributor for a gas turbine engine, including a manifold housing; a balancing valve mounted to the manifold housing and a plurality of flow dividers mounted to the manifold housing. The balancing valve includes a valve member movable along a stroke axis and has an inlet receiving media at a first pressure area and an outlet defining a plurality of first metering orifices. The valve member defining at least one second metering orifice receiving the media at a second pressure area. Each flow divider includes a divider member movable along a stroke axis and has an inlet receiving the media through an associated one of the first metering orifices at a third pressure area and an outlet defining one of a plurality of third metering orifices receiving the media at a fourth pressure area. The balancing valve and each of the flow dividers has a second pressure area. The second pressure area of the balancing valve is at a side of the valve member opposite the first pressure area, and the second pressure area of each flow divider is at a side of the divider member opposite the third pressure area. Flow through the fourth pressure area of each flow divider is substantially the same.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed flow distributing arrangement, which may be used for regulating fuel flow to the burners of turbine engine systems, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The present disclosure provides an arrangement or device for achieving multiple parallel flow streams of gaseous, liquid or mixed media, and further to distribute the flow streams such that they each have the same or substantially the same flow volume. The disclosed arrangement or device may be configured to achieve multiple equivalent flow volumes by automatically compensating for changes in one or more downstream flow conditions of one or more devices receiving one or more of the flow streams. In particular, each flow stream may be associated with a separate and distinct flow receiving device that may initially, or come to over time, have a different flow area relative to one or more of the other flow receiving devices.

In certain embodiments, the distributor arrangement or device is a passive hydro-mechanic system or device that automatically reaches a state of equilibrium collectively across all of the various flow streams. Each flow receiving device is coupled to the flow stream through the distributor arrangement or device, which is in communication with a common reference pressure. Changes to the flow area of one or more of the flow receiving devices are compensated for by pressure adjustments in the distributor arrangement or device with respect to the common reference pressure so as to achieve a balanced, common flow volume for each flow receiving device.

In certain embodiments, the distributor arrangement or device may provide one or more areas of different pressure with respect to each flow receiving device in addition to the common reference pressure and the pressure or pressures at the flow receiving devices themselves. These additional pressure differentials provide flow balancing functionality by adjusting the pressure at a particular flow receiving device to be different from that of one or more of the other flow receiving devices such that the flow throughput is balanced or equalized with the others despite a different flow area at that specific flow receiving device. In some cases, the distributor arrangement or device provides two such additional differing pressure areas associated with each flow receiving device.

In certain embodiments, the different pressure areas are achieved by one or more "metered" or "controlled" orifices or orifice sets, which terms, as used herein, refer to openings that have a dimensioned flow area that is varied by a metering member. In some cases, the flow areas of the metered orifices are controlled by metering members in the form of spools, poppets or other valve members that move to open or close the metered orifices to a greater or lesser extent.

In certain embodiments, the distributor arrangement or device includes a primary valve mechanism, such as referred to herein as a "balancing valve," and a plurality of "flow divider" mechanisms, one associated with each flow stream. It should be understood that these terms are not inherently significant and may be referred in other ways. It should also be understood that the "flow divider" devices themselves do not actually "divide" a single flow stream or otherwise create separate flow streams. Rather, the term is used here in reference to devices used in the gas turbine engine industry to direct fuel flow to either a primary set of nozzles or a secondary set of nozzles in the combustion chamber, thus "dividing" flow between the primary and secondary nozzles.

In any event, a single balancing valve may be used with multiple flow dividers. However, multiple balancing valves may be incorporated into the distributor arrangement or device as well. The balancing valve and flow dividers may be an arrangement of discrete components, each with their own housings and valve bodies, coupled together with suitable plumbing lines and connectors. Alternatively, the balancing valve and the flow dividers may be incorporated into a single component. In certain embodiments, the flow distributor may include a manifold housing in which the balancing valve is mounted along with an array of flow dividers. For example, the balancing valve may be centrally located in the manifold housing with the flow dividers arrayed in a circular pattern around the balancing valve. The balancing valve may communicate with a main inlet port, and internal routing within the manifold housing may provide fluid passages between the orifices of the balancing valves and the various flow dividers and between the orifices of the flow dividers and the outlet ports.

In one example application, the flow distributor arrangement or device may be suitable for use in delivering flow to each of the multiple combustion zones of a gas turbine engine. The elevated temperatures and pressures common in gas turbine engine applications leave the intakes to the combustion chambers (i.e., the array of nozzles and atomizers of the combustion zones) susceptible to diminished flow area due to the build-up of fuel residue or "coke". Because this coking problem may be unpredictable and inconsistent, certain of the array of nozzles and atomizers may be affected more or less than others. This creates inconsistent flow conditions in the array of combustion zones, which may impact the temperature profile of the engine, which, in turn, may create pressure variations that may introduce vibrations and other mechanical anomalies into the downstream turbine section of the engine. In light of the constituent and equivalent flow output from each flow channel, the flow distributor disclosed may also operate to control the "pattern factor" (defined as the difference between peak and average temperatures at the combustor exit divided by the average exit temperature) of the turbine engine in that the flow output from the distributor works to control, that is, reduce, the thermal spread or variation across the various combustion zones of the engine. As used herein in connection with comparative flow volumes of fuel in the combustion section of a gas turbine engine, the term "substantially the same" (and derivatives) means flow volumes that are the same or within a range of different flow volumes that do not have an appreciable effect on the temperature profile in the combustion section, or on the "pattern factor" of the engine.

In addition, the turbine engine may be on a stationary platform, such as a large-scale turbine as used in the power generation industry, or the turbine engine may be on a mobile platform, such as air and space flight vehicles, including on manned or unmanned transport vehicles and on missiles or other weaponry. The disclosed flow distributor arrangement or device has a throughput, temperature rating, sealing and static and dynamic flow properties, in addition to reliability, weight, and size parameters, suitable for use in gas turbine engines powering supersonic and hypersonic flight vehicles.

The present disclosure will now be described with respect to a single component embodiment of the flow distributor suitable for use in a hypersonic flight context. As mentioned, the disclosed flow distributor may be used in turbine engines powering sub-sonic flight vehicles as well as in stationary gas turbine engines. Thus, the following description is intended to provide details of the disclosed flow distributor with respect to a particular, albeit extreme environment, application. As such, the described embodiment does not limit the disclosure. Moreover, the example embodiment is a manifold arrangement, such that separate lines and connections are not required and the system is not subjected to unwanted pressure drops such that it may operate as close as possible to maximum pump pressure. However, again, the example is not limiting.

Figure 1:
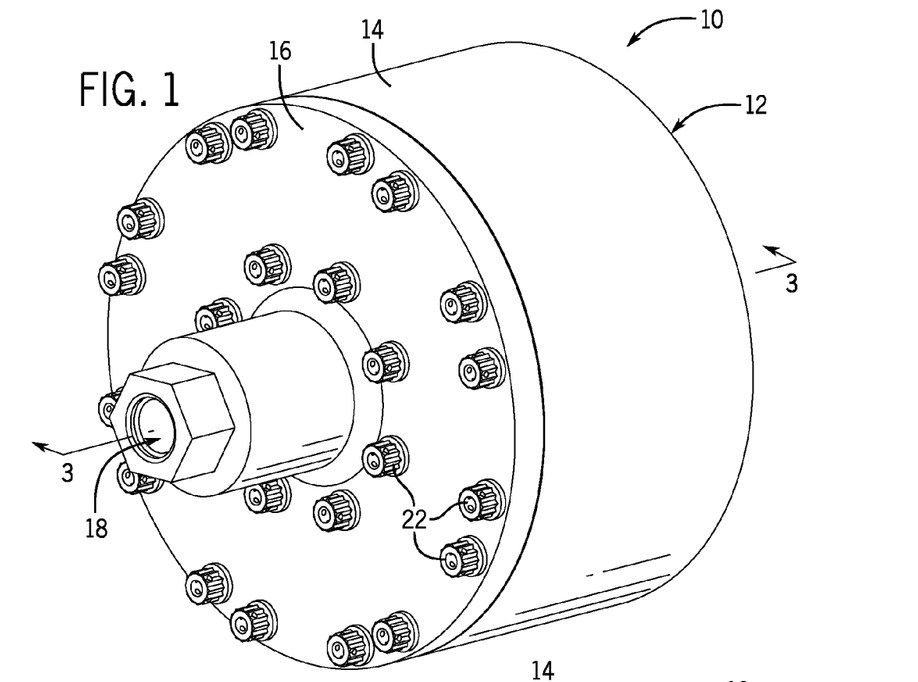
FIGS. 1 and 2 are front and rear perspective views of an example flow distributor in which the disclosed equalizing flow distribution arrangement may be used.
Figure 2:
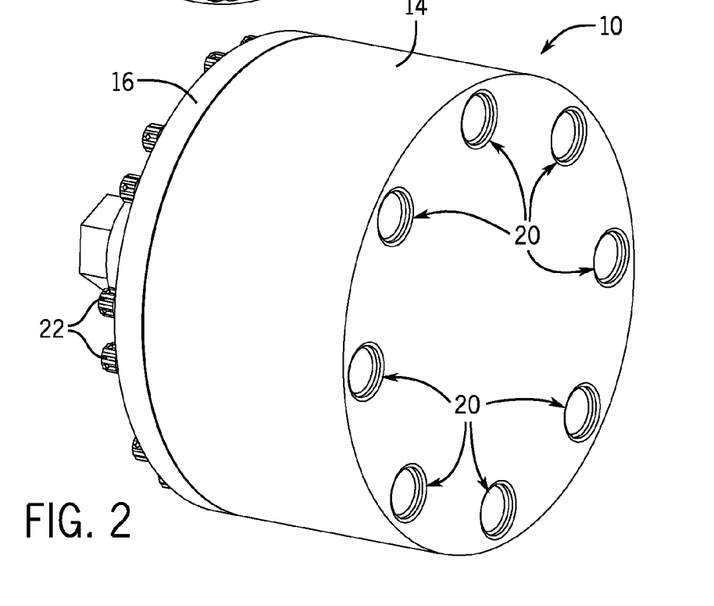

Referring now to FIGS. 1 and 2, a flow distributor 10 has a manifold housing 12 that includes a main body 14 and a cover 16. The cover 16 forms an inlet 18 and the main body 14 forms an array of outlets 20 arranged in a circular pattern. In the illustrated example, the flow distributor 10 has eight outlets 20, which correspond to the number of individual combustion zones (or cans or burners) of an associated gas turbine engine (not shown) with which the flow distributor 10 may be used. The number of combustion zones in the turbine engine may, however, be more or less than eight, and so may the number of outlets 20. Additionally, in certain embodiments, the number of outlets 20 need not be correlated one-for-one with the number of combustion zones, either more or less.

Figure 4:
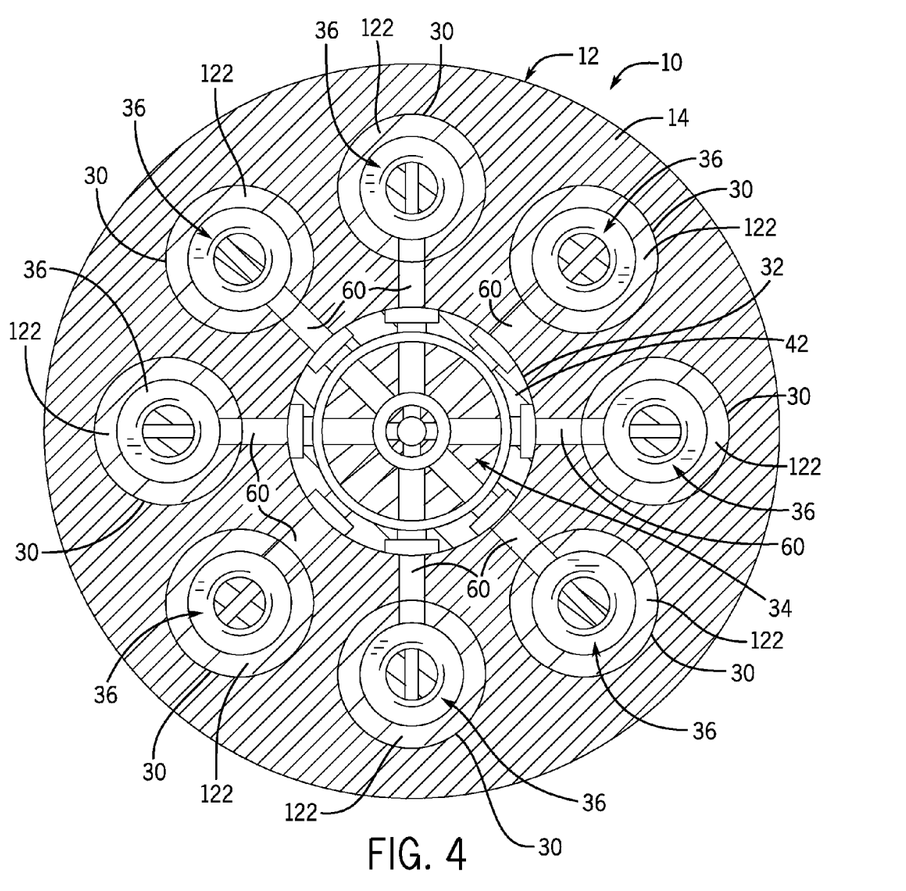
FIG. 4 is a front sectional view thereof taken along path 4-4 of FIG. 3.
Figure 7:
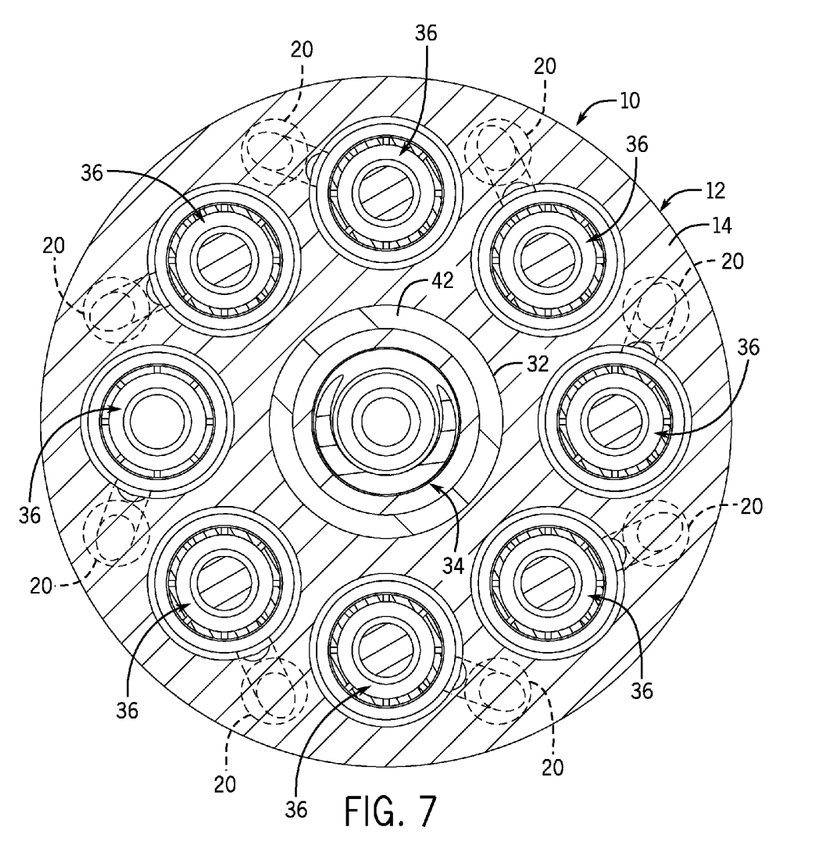
FIG. 7 is a front sectional view taken along line 7-7 of FIG. 3.

The cover 16 attaches to the main body 14 in a rigid manner, such as by the use of bolts 22 (e.g., 12-point head flange bolts). In the illustrated example, a grouping of three bolts 22 (one inner and two outer) is secured to the manifold housing 12 on each side of the eight channels of the device. Referring also to FIGS. 4 and 7, the main body 14 of the manifold housing 12 defines eight identical cylindrical cavities 30 arranged in a circular pattern about a larger, central cavity 32. The central cavity 32 houses a primary valve, referred to herein as a balancing valve 34. Each cavity 30 houses a flow divider 36, and thus, in the described example the flow distributor 10 has eight discrete flow dividers 36. As noted, the flow distributor 10 may be configured to operate with fewer flow dividers 36. The walls of the manifold housing 12 that define the cavities 30, 32 thus define the bodies of the balancing valve and the flow dividers, either alone or in combination with insert sleeves that fit in the cavities 30, 32.

Figure 3:
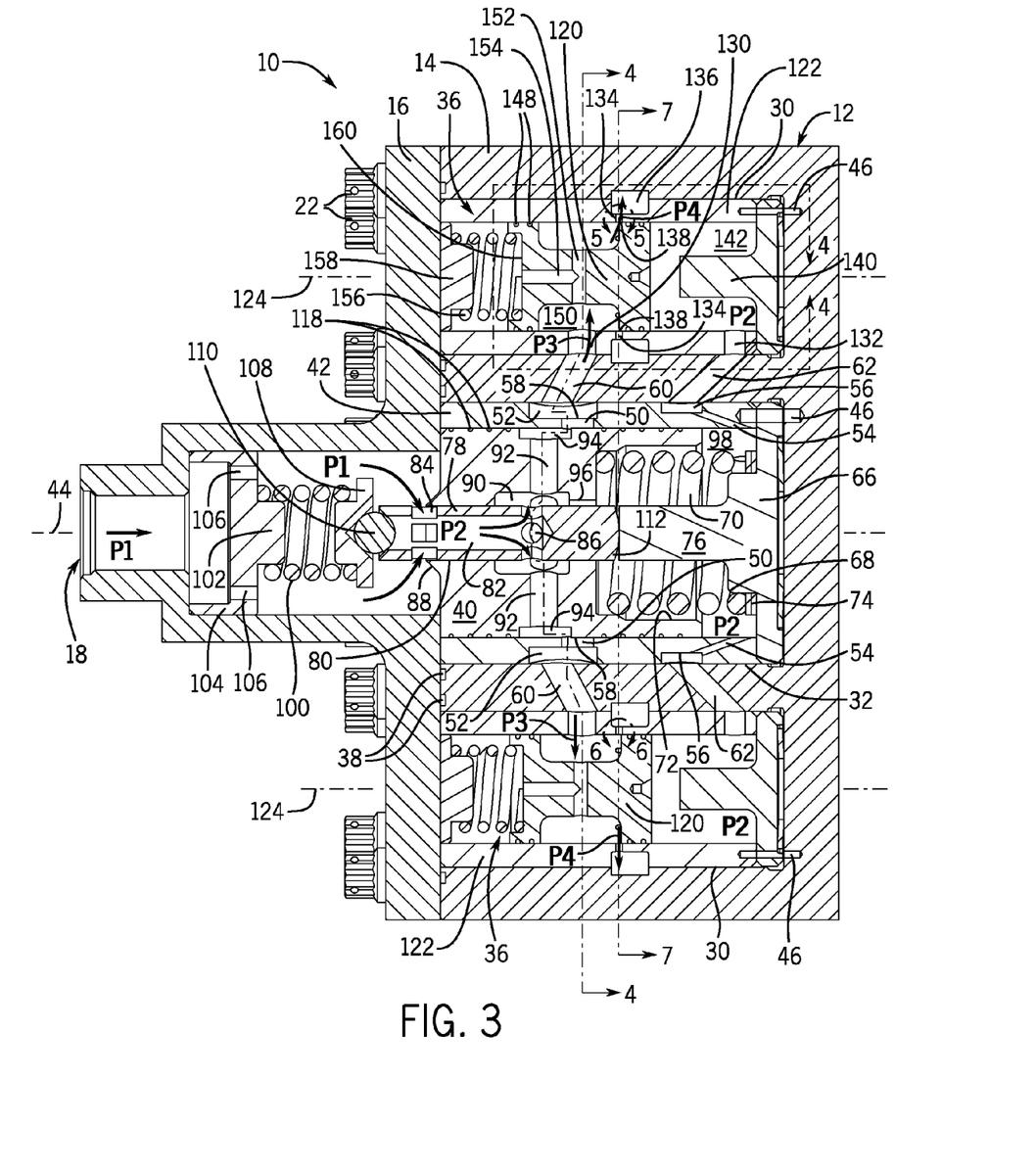
FIG. 3 is a side sectional view thereof taken along line 3-3 of FIG. 1.

Referring also to FIG. 3, the balancing valve 34 generally operates to receive the incoming flow of media from the inlet 18 and to balance the flow between the individual flow dividers 36 as well as modulate a reference balance pressure, as will be described. The balancing valve 34 may be configured in various ways to effect a pressure drop from the inlet 18 and convey media at the lower pressure which is the same as the reference balance pressure. In certain embodiments, the balancing valve 34 is configured to split off media from the inlet flow and direct it to a reservoir or other open space at an opposite side of the valve member from the inlet 18, and that media is kept in communication with similar open spaces in the flow dividers 36, such that the reference balance pressure is common to the balancing valve 34 and each of the flow dividers 36.

In the illustrated example, pressures and flow paths are held with little or no leakage by close tolerances of the mating parts, in at least some cases comprising metal-to-metal static seals. As such, the example construction provides low leakage characteristics without the risk of seal failure, which is particularly important for mission critical applications in which hypersonic engines may be employed. In high temperature, or wide temperature spread, applications, such as is particularly common in hypersonic flight gas turbine engines, the close tolerances of the mating parts is improved by, and in some cases requires, using components made of the same materials, or of materials having the same or similar, and homogenous or near homogenous, temperature properties. Example materials suitable for use in the hypersonic turbine engine application include: stainless steels, such as 440C stainless, nickel chromium alloys, such as an X-750 alloy, and iron nickel chromium alloys, such as an A-286 alloy, among others. It should be noted also that high temperature seals may be incorporated into the distributor to avoid or reduce the close tolerances and material matching of the various components. For example, high temperature seals 38, such as made from high-performance polyimide-based plastics, may be provided between the main body 14 and the cover 16 of the manifold housing 12.

As shown in FIG. 3, the balancing valve 34 has a valve piston 40 that is disposed within the balancing valve cavity 32. The valve piston 40 may have various configurations, including as the cylindrical piston spool valve illustrated. The valve piston 40 may be configured to mate with the bore of the balancing valve 32 directly, in which case the manifold housing 12 would define the valve body and be configured with the necessary orifices and flow passages. Alternatively, as shown, a valve sleeve 42 may be inserted into the balancing valve cavity 32 to also define the valve body in which the valve piston 40 moves along a valve axis 44. In this case, the valve sleeve 42 defines multiple openings arranged along the length of the valve sleeve 42 and at proper angular orientations as needed to distribute a separate flow to each of the flow dividers 36. In order to do this, the openings in the valve sleeve 42 are discrete openings, rather than annular channels, and in which case the valve sleeve 42 must be properly clocked with respect to the manifold housing 12 to keep the openings aligned with the passages to associated flow dividers 36. In the illustrated example, each valve sleeve 42 is secured by one or more pins 46 (one shown) to the manifold housing 12 to maintain the appropriate clocking. Other means of securement could be used, including, for example, press-fit, shrink-fit, welding, threaded fasteners, and so on. In the illustrated example, the valve sleeve 42 has two, or two sets, of openings or passages for each flow divider 36. Specifically, for each flow divider 36, the valve sleeve 42 has inner and outer openings 50, 52 and inner passage 54 and outer opening 56. The inlet openings 50 are metered orifices by virtue of their interface with metering edges 58 of the valve piston 40. The openings 50, 52 may each be a circular blind (or partial depth) opening with the inner opening 50 intersecting, but offset from (i.e., not coaxial with) the outer opening 52 and having a smaller diameter, as shown in FIG. 3. As also shown, the outer opening 56 may be a blind circular opening that is intersected obliquely by the inner passage 54. The position and configuration of the various openings 50, 52, 56 and passages 54 may vary and depend on practical considerations, such as the strength and manufacturability of the valve sleeve 42 or the manifold housing 12. For example, the locations and the enlarged diameters of the outer openings 52 and 56 may be selected to achieve fluid communication between the associated inner opening 50 and the passage 54 with passages 60 and 62, respectively, in the manifold housing 12, which are oriented at an oblique angle suitable to facilitate a drilling operation via the balancing valve cavity 32. Various other factors may additional or alternatively be considered.

Referring still to FIG. 3, the valve sleeve 42 is shorter than the balancing valve cavity 32 to allow room for a spring retainer 66, which may also be rotationally fixed to the manifold housing 12 via one or more of the pins 46 and axially fixed by engagement with valve sleeve 42, which abuts and is held in place by the cover 16. The spring guide or retainer 66 has an annular hub 68 about which a valve spring 70 is fit and which fits into a pocket 72 at a back side of the valve piston 40. One or more shims 74 may fit about the hub 68 between the spring retainer 66 and the valve spring 70 for fine tuning the return force acting on the valve piston 40. The hub 68 of the spring retainer 66 has a narrowed valve stop 76 that extends along the valve axis 44 within the center of the valve spring 70 short of the valve piston 40 in the position shown in FIG. 3. The valve stop 76, however, does not act directly on the valve piston 40, but instead on a valve rod member, or valve stem 78, which extends along the valve axis 44. The valve stem 78 could be a unitary part of the valve stop 76, however, in the illustrated example, the two components are separate and moveable within a constrained range of movement with respect to one another, as will be described. The example valve stem 78 is generally a cylindrical body that fits within a central piston bore 80 in the valve piston 40, which may slide relative to the valve stem 78 along the valve axis 44. The valve stem 78 has an open end leading to an internal passage 82 and has a set of inlet orifices 84 near the open end and a set of outlet flow holes 86 near the closed end of the passage 82. The inlet orifices 84 are metered orifices by virtue of their interface with a metering edge 88 of the valve piston 40. The outlet flow holes 86 communicate flow to an annular groove 90 extending about the piston bore 80, which leads to radial passages 92 and enlarged peripheral openings 94. In the illustrated example, there are four orifices in each of the inlet orifices 84 and outlet flow holes 86, although there could be a different number of orifices in one or both of the sets of orifices, including a single inlet orifice and a single outlet orifice. Also, the cross-sectional profile of the inlet orifices 84 and outlet flow holes 86 may be the same or different, such as having a rectangular (e.g., square) profile or circular profile. The metered inlet orifices 84 in the example embodiment are square to allow for a linear flow profile during metering. The number of radial passages 92 and peripheral openings 94 may correspond to the number of sets of openings in the valve sleeve 42, which, as described above, is equal to the number of flow dividers 36, or eight in this example. Leading from the annular groove 90 is a transfer passage 96 that communicates media, and thereby pressure, to a cavity 98 at the back side of the valve piston 40. The valve stem 78 is biased against the valve stop 76 by another spring 100, which is mounted to a hub 102 of another spring retainer 104 that is secured to the inner walls of the inlet 18 (e.g., by press-fit). The spring retainer 104 has an array of flow passages 106 arranged in a circular pattern outward of the hub 102. The opposite end of the spring 100 is connected to a ball seat 108 against which a ball 110 is held under spring force against the open end of the valve stem 78, which may be cupped to provide a partially spherical seat. The ball 110 allows for a spherical ball-joint interface with the spring 100. This spherical connection reduces or eliminates side loading of the valve stem 78 from the spring 100, which otherwise could tend to cause binding of the valve stem 78 in the valve piston 40. The spring 100 and ball 110 keep the valve stem 78 pressed against the valve stop 76, thereby facilitating the use of a separate and detached valve stem 78 component, which may move slightly off axis, for example by pivoting on its rounded end 112, in the event that the valve piston 40 deviates slightly from the valve axis 44 during its stroke. As shown in FIG. 3, a series of narrow float grooves 118 may be formed between the valve piston 40 and the valve sleeve 42, such as in the outer diameter of the valve piston 40, to facilitate sliding of the valve piston 40 and reduce galling.

With continued reference to FIG. 3, an example flow divider arrangement will now be described. In the illustrated example, each of the eight flow dividers is of the same construction, and thus, for brevity, only one of the flow dividers 36 will be detailed. It will be understood that the corresponding description will be applicable to each of the other flow dividers. It should also be understood that the flow dividers of other configurations could be used for one or more, or indeed all, of the flow dividers. In any case, during operation of the flow distributor 10, each flow divider 36 may assume a different operational orientation, as will be described.

Each flow divider 36 has a divider member 120 that is disposed within one of the flow divider cavities 30. The divider member 120 may have various configurations, including as the cylindrical piston spool illustrated. The divider piston 120 may be configured to mate with the bore of the associated flow divider cavity 30 directly, in which case the manifold housing 12 would be the divider body and be configured with the necessary orifices and flow passages. Alternatively, as shown, a divider sleeve 122 may be inserted into each flow divider cavity 30 to also define the divider body in which the divider piston 120 moves along a flow divider axis 124, which may generally be parallel to the valve axis 44 of the balancing valve 34. In this case, the divider sleeve 122 defines inlet openings 130 and 132 arranged along the length of the divider sleeve 122 and at the proper angular orientations as needed to communicate media from the passages 60 and 62. Again to ensure the proper clocking, the divider sleeve 122 may be secured to the manifold housing 12, such as using pins 46 (or press-fit, shrink-fit, welding, threaded fasteners, and so on). While shown as discretely located circular openings, in the flow dividers 36 the inlet openings 130, 132 could be annular channels to avoid the clocking requirement, and the associated use of the pins 46 or other means of securement. The divider sleeve 122 also defines outlets. In the example embodiment, the divider sleeve 122 defines one or more inner orifices 134 which communicate with an annular outlet channel 136. The outlet channel 136 of each flow divider 36 is in communication with an associate outlet 20 through dedicated internal passages in the manifold housing 12, as shown in FIG. 7. In this example, there are four inner orifices 134 formed as circular blind openings that intersect the annular channel 136, which is formed by aligned partial depth circumferential grooves in the outer diameter of the divider sleeve 122 and the inner diameter of each flow divider cavity 30 formed in the manifold housing 12. The inner orifices 134 have a smaller diameter (or axial dimension) than the annular channel 136 and define metered orifices by virtue of their interface with a metering edge 138 of the divider piston 120. As with the balancing valve 34, the position and configuration of the various openings 130, 132, orifices 134 and the annular channel 136 may vary and depend on practical considerations, such as the strength and manufacturability of the divider sleeve 122 or the manifold housing 12, such as to allow the passages 60 and 62 to be drilled via the balancing valve cavity 32 and other factors.

Each divider sleeve 122 may be shorter than its associated flow divider cavity 30 to allow room for a divider stop 140, which may also be rotationally fixed to the manifold housing 12 via one or more of the pins 46 and axially fixed by engagement with divider sleeve 122, which abuts and is held in place by the cover 16. The divider stop 140 is located in a cavity 142 at the back side of the divider piston 120 that receives media from the inlet opening 132. The narrowed end of the divider stop 140 extends along the divider axis 124 short of the divider piston 120 in the position shown in FIG. 3. As mentioned, the divider piston 120 may have a spool configuration. Like the valve piston 40, one or more narrow float grooves 148 may be formed between the divider piston 120 and the divider sleeve 122, such as in the outer diameter of the divider piston 120, to facilitate sliding of the divider piston 120 and reduce galling. In the example embodiment, the divider piston 120 has a central annular groove 150 in its outer diameter, which defines the metering edge 138 and communicates with a radial passage 152, which communicates with an axial passage 154. The axial passage 154 communicates with a spring cavity at the front side of the divider piston 120 containing a spring 156 that mounts at one end to the hub of a spring retainer 158 and at the other end to a pocket 160 in the divider piston 120. The spring retainer 158 may be secured to the cover 16 or held in place by the force of the spring 156 and media pressure.

Having described example constructions of the flow distributor 10, the operational benefits and characteristics of the example flow distributor 10 will now be described in connection with a gas turbine engine, such as a hypersonic flight gas turbine application. As will be understood, the gas turbine engine system may generally include a fuel pressurizer and main fuel control valve, which may be controlled by a dedicated or master electronic control unit that controls overall flow of pressurized fuel to the combustion side of the turbine engine. The flow distributor 10 may be placed in line between the main control valve and turbine engine to equalize the flow to each of the individual burners or combustion zones (i.e., to the primary and/or secondary nozzles and atomizers). The flow distributor 10 provides the flow balancing or equalization passively by rapidly finding an internal pressure equilibrium state automatically and continuously as downstream flow conditions change (e.g., nozzle orifices reducing in flow area due to coking). In providing and maintaining consistent and equal flow volume to each combustion zone, the flow distributor 10 works to maintain consistent and equal flame temperatures across the array of combustion zones, and thereby acts as a pattern factor control device, to reduce the temperature spread and operate the engine at as close to peak temperature as possible. Thus, the flow distributor 10 may serve to avoid otherwise deleterious effects on the turbine engine, including, for example, vibration and other mechanical irregularities in the turbine section of the engine arising from pressure variations caused by the temperature spread in the combustion section. Moreover, since the flow distributor 10 provides this flow balancing, and pattern factor control, passively, the complexities and potential for compromised reliability caused by anomalies in an active control system (e.g., including one or more dedicated controllers and thermocouples or other temperature sensors) may be avoided. Additionally, without the processing required by active control systems, the flow distributor 10 is able to operate at the extreme flow rates associated with hypersonic flight turbine engines. Further, the heat generated by the turbine engine may be used to heat the fuel, which may be injected at elevated temperatures to improve the efficiency of the turbine engine. Thus, the flow distributor 10 may be used to regulate flow of fuel that is already at an elevated temperature, so that the burner temperatures, and thus the engine efficiency, may be higher and closer to optimal conditions. By way of non-limiting examples, the flow distributor 10 may be operated to regulate hot jet fuel, such as JP-10, at about 0-650° F. with inlet pressures ranging from about 0-1,100 psig and flow rates ranging from about 650-3,000 lbs/hr.

As noted, the flow distributor 10 equalizes output flow by making internal pressure and flow adjustments in the manner now described. As shown in FIG. 3, arrangement of the flow distributor 10 creates zones of pressure differences, which will be referred to as pressure areas P1, P2, P3 and P4. It may, however, be possible to equalize flow from the various flow dividers using more than four pressure zones. In the example flow distributor 10, the media enters through the inlet 18 to pressure area P1, which occupies the volume from the inlet 18 to the metered inlet orifices 84 of the valve stem 78. The aggregate flow area through the individual flow passages 106 of the spring retainer 104 is at least as large as the flow area of the inlet 18 such that no change in pressure or flow occurs across the spring retainer 104. The flow and pressure values in the pressure area P1 remains at the system pressure at or near the flow pump pressure during steady state operation.

The media passes from the pressure area P1 through the metered inlet orifices 84 to pressure area P2 at the internal passage 82 of the valve stem 78. The flow area through the metered inlet orifices 84 is variable and dependent upon the position of the valve piston 40, in particular the metering edge 88, and thus, the flow and pressure values in the pressure area P2 may change during transient states of flow distributor 10. Once inside the valve stem 38, media will flow through the internal passage 82 and exit through the outlet flow holes 86, passing first through the annular groove 90 and then diverting before exiting the valve piston 40 either via the radial passages 92 or the transfer passage 96. Flow through the transfer passage 96 enters the reservoir or cavity 98 of the balancing valve 34. The pressure in pressure area P2 is transferred to each of the flow dividers 36 via a separate and dedicated set of openings and passages for each flow divider, namely, via the passage 54, the opening 56, the passage 62 and the opening 132. Thus, the balancing valve 34 and each flow divider 36 have a common reference pressure value at the back side of the associated valve 40 or divider 120 member.

A separate and dedicated set of other openings and passages deliver media to each flow divider at a third pressure area P3, which may differ for each flow divider 36 at least temporarily. Specifically, media flowing through the individual radial passages 92 passes through the peripheral openings 94 (in pressure area P2) and is metered through the inner openings 50, before passing through the outer openings 52, the passages 60 and openings 130 at pressure area P3. The flow area through the metered openings 50 is variable depending on the position of the valve piston 40, in particular, the position of the metering edges 58, and thus, the flow and pressure values in the pressure area P3 may change during transient states of the flow distributor 10.

Once inside the individual flow dividers 36, the media moves through the annular groove 150, the passages 152, 154 and the spring cavity, all of which comprise a part of pressure area P3. Media exits each flow divider 36 through the inner orifices 134, passing to the associated outlet 20 via the outlet channel 136 and the internal passage within the manifold housing 12 (see FIG. 7). Media is metered through the inner orifices 134 such that the flow area through the metered inner orifices 134 is variable depending on the position of the divider piston 120, in particular, the position of the metering edge 138, and thus, the flow and pressure values in the pressure area P4 may be different and change during transient states of the flow distributor 10. Here, it is important to note that, while transient changes in flow and pressure occur at pressure area P4, the flow distributor 10 very rapidly finds equilibrium so that the flow at each of the pressure areas P4 is substantially the same during steady-state operation of the flow distributor 10.

Over time, or when the turbine engine undergoes certain changes in operational state, the downstream flow area (e.g., at one or more of the burner nozzles) may change. By repressurizing itself, the flow distributor 10 will automatically compensate for the variation in flow area downstream of a particular flow divider to re-establish a flow volume that is the substantially the same as the flow from the other flow dividers 36. This will be described by the following example in which one of the burner nozzles is subjected to coking to a greater extent than the others such that the flow area of the associated nozzle opening is reduced.

Figure 5:
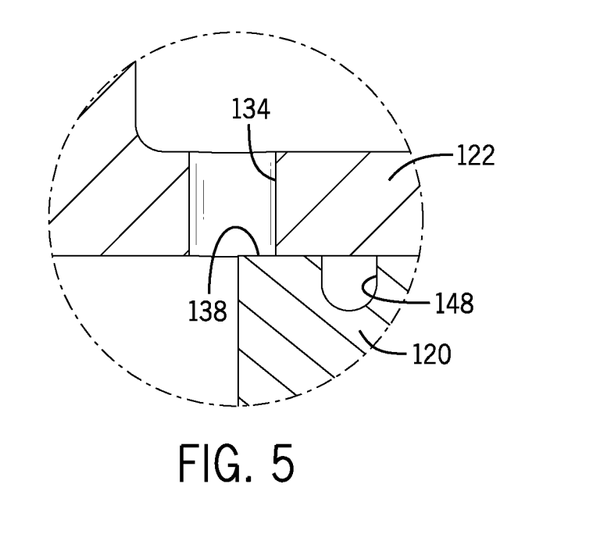
FIGS. 5 and 6 are enlarged detail views of the areas 5-5 and 6-6 of FIG. 3.
Figure 6:
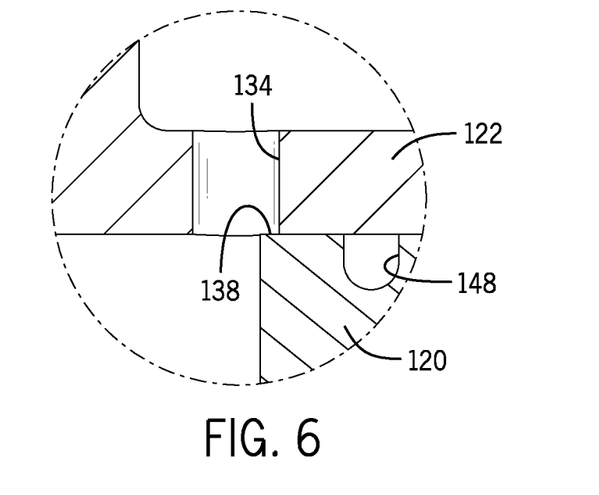

In the event of an increase in flow restriction downstream of one of the flow dividers 36, the pressure value at the pressure area P4 of that particular flow divider 36 will rise. The rise in P4 pressure will effect a corresponding drop in P3 pressure within that particular flow divider 36. This transient P4-P3 pressure difference will cause the associated divider piston 120 to move under the force of the spring 156 (to the left in FIG. 3) given the relative decrease in P3 pressure to allow increased flow through pressure area P4 in that flow divider 36. Since each individual flow divider 36 is at all times in communication with the balancing valve 34 via passages 60, the decrease in P3 pressure will initially cause the P2 pressure at the upstream side of the valve piston 40 to rise. This will cause the valve piston 40 to move temporarily against the valve spring 70 (to the right in FIG. 3) given the relative increase in upstream P2 pressure, until the P2 pressure equalizes on both sides of the valve piston 40 and is returned to the position shown in FIG. 3. Since the pressure area P1 is communication with the inlet, the P1 pressure remains effectively constant at or near the pump pressure. The adjusted reference P2 pressure is communicated back to the adjusted flow divider 36 to stabilize the associated divider piston 120 at its new position. The passages 54 which feed the reference P2 pressure to the flow dividers 36 acts as dampening orifices, as these passages are sized to inhibit rapid flow into and out of the cavity 142. As showing in FIGS. 3 and 5-6, the new position of the divider piston 120 in the corresponding flow divider 36 may be maintained at a different stroke location than the divider members of the other flow dividers during steady-state operation. To summarize, each flow divider 36 modulates the local P3/P4 pressure of the flow divider 36 for the associated burner nozzle to allow its divider piston 120 to change position, and the balancing valve 34 modulates the P2 pressure to position the divider piston 120 of the associated flow divider 120 as necessary to equalize or balance its flow so that in steady state operation of the flow distributor 10 the flows from all of the flow dividers 36 are the substantially the same. Further, because the flow distributor 10 includes variable metering orifices it is capable of equalizing flow for various or "resettable" flow set points, thus making the flow distributor 10 usable in varied and changing flow conditions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An equilibrating flow distributor for a gas turbine engine, comprising:
   a balancing valve including a valve member movable along a stroke axis, the balancing valve having an inlet receiving media at a first pressure area and an outlet defining a plurality of first metering orifices, the valve member defining at least one second metering orifice receiving the media at a second pressure area; and
   a plurality of flow dividers, each flow divider including a divider member movable along a stroke axis, the flow divider having an inlet receiving the media through an associated one of the first metering orifices at a third pressure area and an outlet defining one of a plurality of third metering orifices receiving the media at a fourth pressure area, each of the flow dividers having a second pressure in communication with the second pressure area of the balancing valve;
   wherein flow through the fourth pressure area of each flow divider is substantially the same.

2. The flow distributor of claim 1, wherein the second pressure area of the balancing valve is at a side of the valve member opposite the first pressure area and the second pressure area of each flow divider is at a side of the divider member opposite the third pressure area.

3. The flow distributor of claim 1, wherein a flow area of the third metering orifice of at least one of the flow dividers is different than the others.

4. The flow distributor of claim 1, further including a manifold housing containing the balancing valve and the flow dividers;
   wherein the manifold housing defines internal passages extending between associated pairs of the first metering orifices and the inlets of the flow dividers.

5. The flow distributor of claim 4, wherein the manifold housing defines an outlet port corresponding to each of the flow dividers and defines internal passages extending between associated pairs of the third metering orifices and the outlet ports.

6. The flow distributor of claim 4, wherein the balancing valve includes an opening at a side of the valve member opposite the first pressure region;
   wherein each flow divider includes an opening at a side of the divider member opposite the associated third metering orifice; and
   wherein the manifold housing defines internal passages extending between associated pairs of the openings in the balancing valve and the flow dividers.

7. The flow distributor of claim 1, wherein the balancing valve defines a transfer passage in communication with the at least one second metering orifice and an open space within the valve body opposite the valve member.

8. The flow distributor of claim 7, wherein the valve member is biased away from the second pressure area by a spring.

9. The flow distributor of claim 7, wherein the valve member includes a valve stem biased toward the second pressure area by a first spring and a spool slidable along the stroke axis with respect to the valve stem and biased away from the second pressure area by a second spring.

10. The flow distributor of claim 8, wherein the valve stem is coupled to the first spring by a ball joint.

11. The flow distributor of claim 1, wherein, in each flow divider, the divider member is biased against the second pressure area by a spring.

12. An equilibrating flow distributor for a gas turbine engine, comprising:
    a balancing valve including a valve body and a valve member movable within the valve body along a stroke axis, the valve body having an inlet receiving media at a first pressure area and an outlet defining a plurality of first metering orifices, the valve member defining at least one second metering orifice receiving the media at a second pressure area; and
    a plurality of flow dividers, each flow divider including a divider body and a divider member movable along a stroke axis within the divider body, the divider body having an inlet receiving the media through an associated one of the first metering orifices at a third pressure area and an outlet defining one of a plurality of third metering orifices receiving the media at a fourth pressure area;
    wherein the balancing valve and each of the flow dividers has a second pressure area, the second pressure area of the balancing valve being at a side of the valve member opposite the first pressure area and the second pressure area of each flow divider being at a side of the divider member opposite the third pressure area;
    wherein flow through the fourth pressure area of each flow divider is substantially the same;
    and wherein a flow area of the third metering orifice of at least one of the flow dividers is different than the others.

13. The flow distributor of claim 12, wherein a pressure difference between the second pressure area and the third pressure area sets a position along the stroke axis of the divider member; and
    wherein a pressure difference between the third pressure area and the fourth pressure are sets a flow through the fourth pressure area.

14. The flow distributor of claim 12, further including a manifold housing containing the balancing valve and the flow dividers;
    wherein the manifold housing defines internal passages extending between associated pairs of the first metering orifices and the inlets of the flow dividers.

15. The flow distributor of claim 14, wherein the valve body includes an opening at a side of the valve member opposite the first pressure region;
    wherein the divider body of each flow divider includes an opening at a side of the divider member opposite the associated third metering orifice; and
    wherein the manifold housing defines internal passages extending between associated pairs of the openings in the valve body and the divider body.

16. The flow distributor of claim 14, wherein the manifold housing defines an outlet port corresponding to each of the flow dividers and defines internal passages extending between associated pairs of the third metering orifices and the outlet ports.

17. The flow distributor of claim 12, wherein the balancing valve defines a transfer passage in communication with the at least one second metering orifice and an open space within the valve body opposite the valve member.

18. The flow distributor of claim 17, wherein the valve member includes a valve stem biased toward the second pressure area by a first spring and a spool slidable along the stroke axis with respect to the valve stem and biased away from the second pressure area by a second spring.

19. An equilibrating flow distributor for a gas turbine engine, comprising:
- a manifold housing;
- a balancing valve mounted to the manifold housing, the balancing valve including a valve member movable along a stroke axis and having an inlet receiving media at a first pressure area and an outlet defining a plurality of first metering orifices, the valve member defining at least one second metering orifice receiving the media at a second pressure area; and
- a plurality of flow dividers mounted to the manifold housing, each flow divider including a divider member movable along a stroke axis and having an inlet receiving the media through an associated one of the first metering orifices at a third pressure area and an outlet defining one of a plurality of third metering orifices receiving the media at a fourth pressure area;
- wherein the balancing valve and each of the flow dividers has a second pressure area, the second pressure area of the balancing valve being at a side of the valve member opposite the first pressure area and the second pressure area of each flow divider being at a side of the divider member opposite the third pressure area; and
- wherein flow through the fourth pressure area of each flow divider is substantially the same.

20. The flow distributor of claim 19, wherein the balancing valve defines a transfer passage in communication with the at least one second metering orifice and an open space within the valve body opposite the valve member.

* * * * *